US010288515B2

(12) United States Patent
Hengstler

(10) Patent No.: US 10,288,515 B2
(45) Date of Patent: May 14, 2019

(54) PRESSURE DIFFERENCE SENSOR COMPRISING AT LEAST ONE MEASURING CELL, PRESSURE MEANS AND MEASUREMENT LINE

(71) Applicant: VEGA GRIESHABER KG, Wolfach (DE)

(72) Inventor: Clemens Hengstler, Haslach (DE)

(73) Assignee: VEGA GRIESHABER KG, Wolfach (DE)

( * ) Notice: Subject to any disclaimer, the term of this patent is extended or adjusted under 35 U.S.C. 154(b) by 114 days.

(21) Appl. No.: 15/479,492

(22) Filed: Apr. 5, 2017

(65) Prior Publication Data

US 2018/0128699 A1 May 10, 2018

(30) Foreign Application Priority Data

Nov. 4, 2016 (EP) .................................... 16164735

(51) Int. Cl.
*G01L 19/04* (2006.01)
*G01L 13/02* (2006.01)

(52) U.S. Cl.
CPC .............. *G01L 19/04* (2013.01); *G01L 13/02* (2013.01); *G01L 13/025* (2013.01)

(58) Field of Classification Search
CPC ..... G01L 19/147; G01L 9/0042; G01L 19/04; G01L 9/0072; G01L 13/025; G01L 9/0054; G01L 9/0075; G01L 19/0038; G01L 19/0084; G01L 19/14; G01L 19/069; G01L 19/0618; G01L 19/0645; G01L 9/0052; G01L 9/0055; G01L 9/0073; G01L 19/0092; G01L 19/143; G01L 9/0051; G01L 11/025; G01L 19/0046; G01L 19/06; G01L 19/0627; G01L 19/0681; G01L 9/00; G01L 9/0041; G01L 9/0044; G01L 11/04; G01L 19/0007; G01L 19/0023; G01L 19/0672; G01L 19/069; G01L 19/142; G01L 19/16; G01L 27/002; G01L 7/00; G01L 7/163; G01L 7/166; G01L 9/0047;
(Continued)

(56) References Cited

U.S. PATENT DOCUMENTS

2002/0026835 A1* 3/2002 Jacob .................... G01L 9/0075
73/708
2010/0083731 A1* 4/2010 Hedtke ................. G01L 27/007
73/1.57
(Continued)

FOREIGN PATENT DOCUMENTS

DE 10 2009 022 762 A1 12/2012

OTHER PUBLICATIONS

EPO search report for related international application 16 164735.9, dated Oct. 17, 2016.

*Primary Examiner* — Andre J Allen
(74) *Attorney, Agent, or Firm* — William Gray Mitchell

(57) ABSTRACT

A pressure difference sensor with at least one pressure difference measuring cell, at least a first pressure means, and at least a first measurement line for transferring a first pressure applied upon the first pressure means to a first side of the pressure difference measuring cell, characterized in that the pressure difference sensor comprises at least a first compensation line, which is arranged parallel to the first measurement line and is connected to a second side of the pressure difference measuring cell.

8 Claims, 4 Drawing Sheets

(58) Field of Classification Search
CPC ......... G01L 11/02; G01L 13/00; G01L 15/00; G01L 19/0609; G01L 19/083; G01L 19/148; G01L 7/08; G01L 9/0045; G01L 9/0048; G01L 9/006; G01L 9/007; G01L 9/0076; G01L 9/045; G01L 9/06; G01L 9/065; G01L 9/12; G01L 9/125; G01L 11/00; G01L 17/00; G01L 19/00; G01L 19/0015; G01L 19/003; G01L 19/0076; G01L 19/02; G01L 19/08; G01L 19/10; G01L 19/141; G01L 19/145; G01L 19/146; G01L 1/142; G01L 1/18; G01L 1/2262; G01L 1/2287; G01L 1/246; G01L 1/26; G01L 21/12; G01L 23/16; G01L 27/005; G01L 27/007; G01L 7/04; G01L 7/063; G01L 7/082; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/04; G01L 9/08; G01L 9/085; G01L 9/105; G01L 9/14; G01L 9/16

See application file for complete search history.

(56) References Cited

U.S. PATENT DOCUMENTS

| | | | |
|---|---|---|---|
| 2011/0100130 A1* | 5/2011 | Gruhler | G01L 1/142 73/708 |
| 2013/0233085 A1 | 9/2013 | Mizoguti et al. | |
| 2016/0320256 A1* | 11/2016 | Burgard | G01L 9/0072 |
| 2017/0343440 A1* | 11/2017 | Drewes | G01L 9/0075 |

* cited by examiner

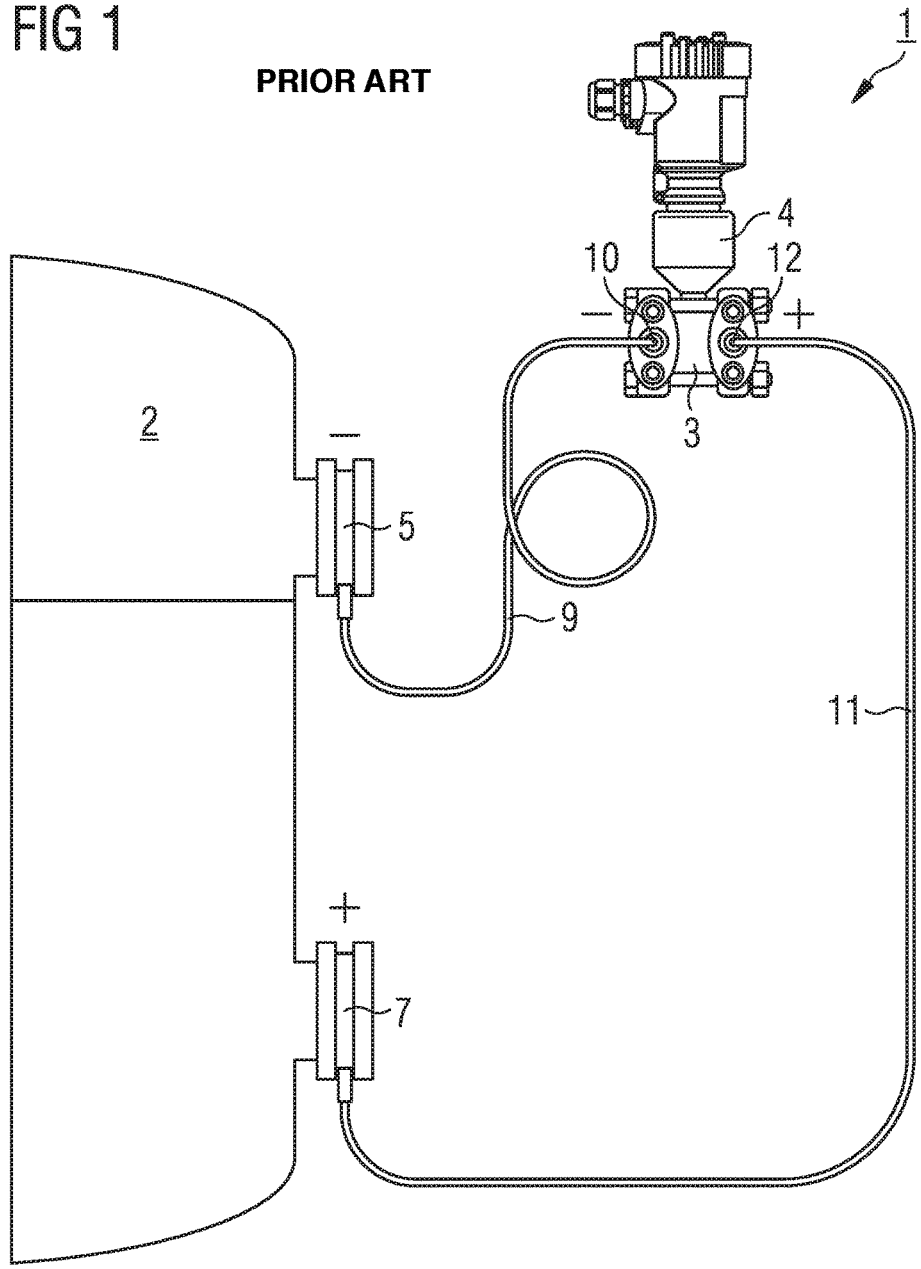

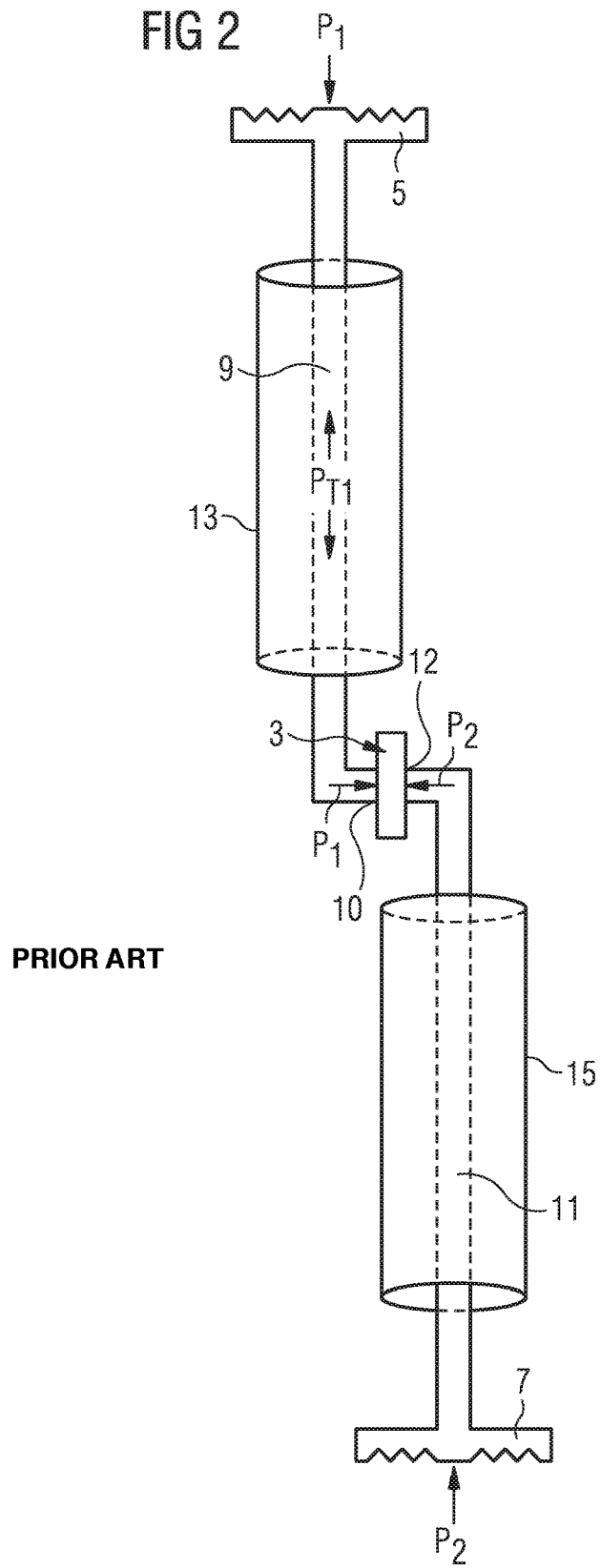

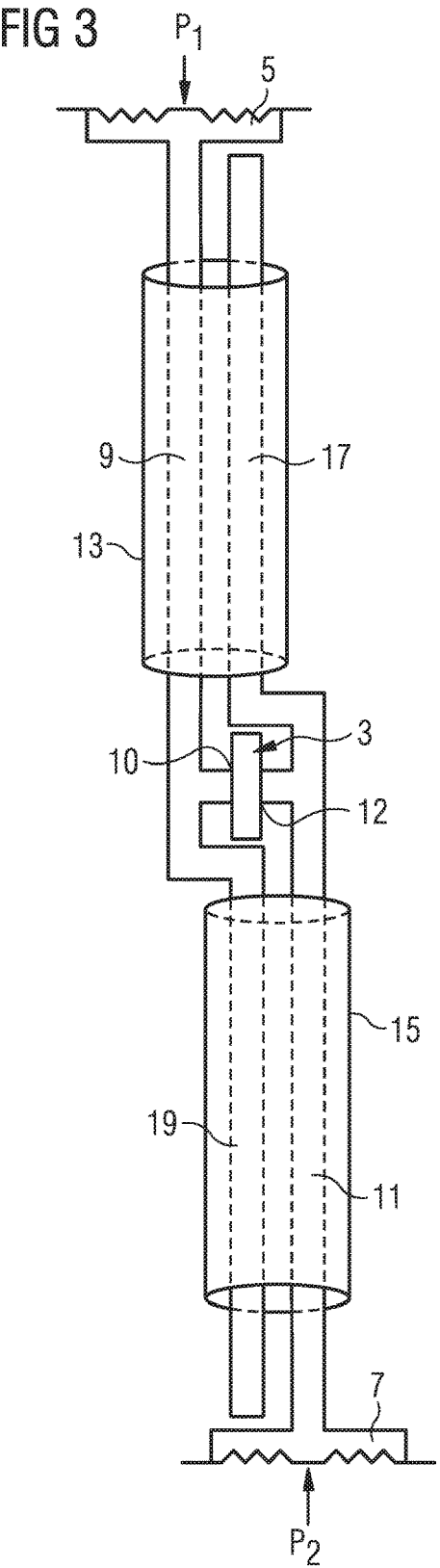

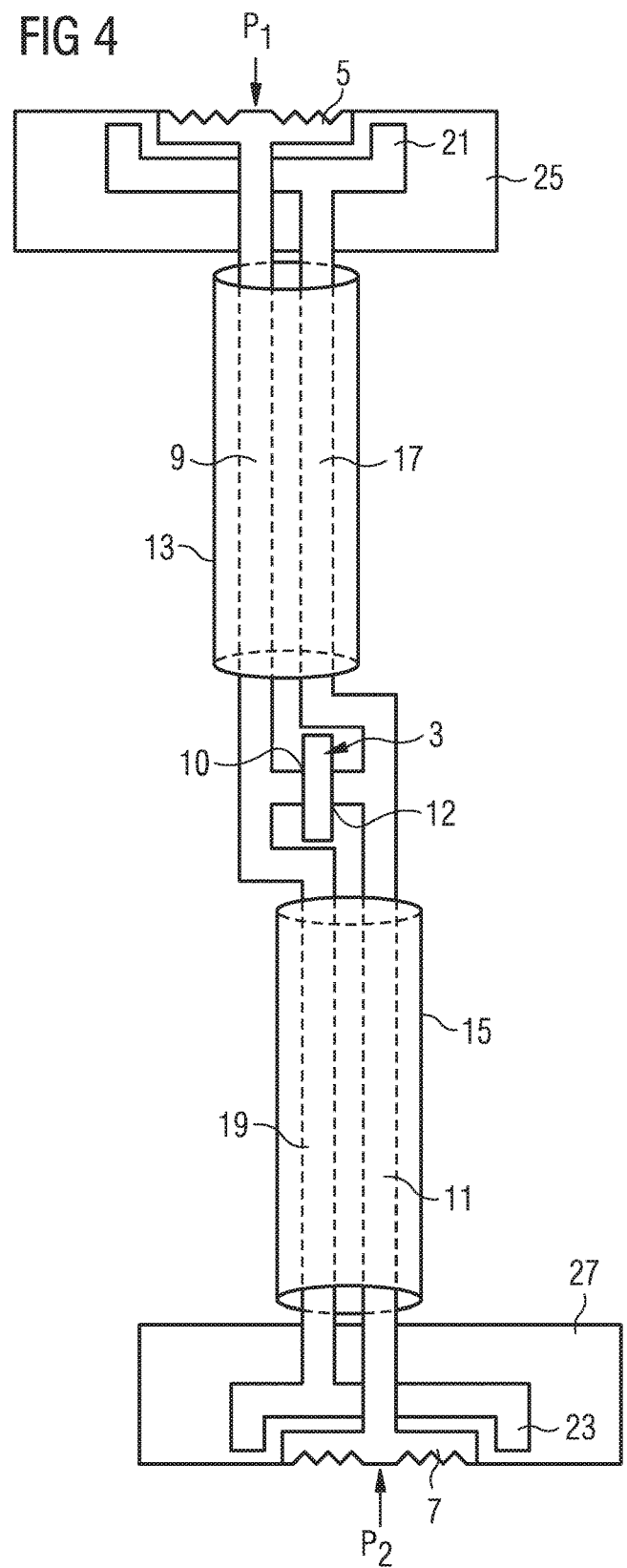

PRESSURE DIFFERENCE SENSOR COMPRISING AT LEAST ONE MEASURING CELL, PRESSURE MEANS AND MEASUREMENT LINE

CROSS REFERENCE TO RELATED APPLICATIONS

This patent application claims priority to European Patent Application 16 164735.9, filed on Apr. 11, 2016.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a pressure difference sensor.

Background of the Invention

The present invention relates to a pressure difference sensor comprising at least one pressure difference measuring cell, at least a first pressure means, as well as at least a first measurement line for transferring a first pressure applied upon the first pressure means to the pressure difference measuring cell.

Pressure difference sensors are generally known from prior art and serve for the detection of pressure differences as precisely as possible between two positions in the measurement environment. Frequently one or both of the sides are connected via a pressure means to the pressure difference measuring cell. Such a known design is shown in FIG. 1 as an example.

FIG. 1 shows a pressure difference sensor 1 with a pressure difference measuring cell 3 being arranged in a housing 4. The pressure difference measuring cell 3 is fed via two inputs 10, 12 with pressures detected by pressure means 5, 7, using corresponding measurement lines 9, 11. The pressure difference measuring cell 3 is therefore on the one hand connected via a first measurement line 9 to a first pressure means 5, in the present case arranged in an upper section of the tank 2. On the other side, the pressure difference measuring cell 3 is connected via a second measurement line 11 to a second pressure means 7, as shown in FIG. 1, arranged in a lower section of the tank 2.

In the present exemplary embodiment the pressure means 5, 7 are each embodied as elements provided with a pressure-sensitive membrane, which is connected via the measurement lines 9, 11 to the pressure difference measuring cell 3. By an incompressible transfer medium, arranged in the pressure means 5, 7, as well as the measurement lines 9, 11, a process pressure P1, P2 applied upon the pressure means 5, 7 is transferred to the respective side 10, 12 of the pressure difference measuring cell 3 and can be detected thereby.

FIG. 2 shows a sketch of the principle underlying the pressure difference measuring sensor 1 shown in FIG. 1.

According to the present exemplary embodiment the pressure difference measuring cell 3 is connected with its first side 10 via a first measurement line 9 to a first pressure means 5, acted upon by a first process pressure P1. The first measurement line 9 is arranged in the first cover 13, which is formed as a mechanical protection for the first measurement line 9.

The second side 12 of the pressure difference measuring cell 3 is connected via the second measurement line 11 to the second pressure means 7, acted upon by a second process pressure P2. In the present exemplary embodiment the second measurement line 11 is arranged in a second cover 15, which also acts as a mechanical protection for the second measurement line 11.

In pressure difference sensors of the above-described type known from prior art it is considered disadvantageous that additional temperature influences outside the process environment, for example acting upon the measurement line and/or mechanical impact upon the measurement line, for example strong bending thereof, can falsify the measuring result. Further it is considered disadvantageous that the process temperature influencing the pressure means also causes measurement faults. The temperature induced measurement faults result here from an expansion of the transfer medium contained in the pressure means and the measurement line, which leads to pressurization of the pressure measuring cell.

It is known in prior art to detect such temperature-induced measurement faults via temperature sensors in the pressure means and/or the pressure measuring cell and to electronically compensate them. The presence of additional temperature sensors, ideally inside the pressure means and the pressure measuring cell, is however considered disadvantageous due to the increased wiring expense and the higher costs for the additionally required sensors.

The objective of the present invention is to further develop a pressure difference sensor according to prior art such that compensation of temperature-induced or mechanically induced measurement faults is possible in a cost-effective and precise fashion.

BRIEF SUMMARY OF THE INVENTION

In a preferred embodiment, a pressure difference sensor (1) with at least one pressure difference measuring cell (3), at least a first pressure means (5), and at least a first measurement line (9) for transferring a first pressure (P1) applied upon the first pressure means (5) to a first side (10) of the pressure difference measuring cell (3), characterized in that the pressure difference sensor (1) comprises at least a first compensation line (17), which is arranged parallel to the first measurement line (9) and is connected to a second side (12) of the pressure difference measuring cell (3).

In another preferred embodiment, the pressure difference sensor (1) as described herein, characterized in that the compensation line (17) shows the same features as the measurement line (9).

In another preferred embodiment, the pressure difference sensor (1) as described herein, characterized in that the pressure difference sensor (1) comprises a second pressure means (7) as well as a second measurement line (11) for transferring a second pressure (P2) applied upon the second pressure means (7) to the second side (12) of the pressure difference measuring cell (3) as well as a second compensation line (19) showing the same features as the second measurement line (11), which is arranged parallel in reference to the second measurement line (11).

In another preferred embodiment, the pressure difference sensor (1) as described herein, characterized in that the first compensation line (17) and/or the second compensation line (19) are connected to a pressure-insensitive element (21, 23) replicating the corresponding pressure means (5, 7), which is subjected to the process conditions in the same fashion as the corresponding pressure means (5, 7).

In another preferred embodiment, the pressure difference sensor (1) as described herein, characterized in that the pressure-insensitive element (21, 23) is integrated jointly with the corresponding pressure means (5, 7) in a process connection (25, 27).

In another preferred embodiment, the pressure difference sensor (1) as described herein, characterized in that the pressure-insensitive element (21, 23) is embodied annularly surrounding the corresponding pressure means (5, 7).

In another preferred embodiment, the pressure difference sensor (1) as described herein, characterized in that the pressure-insensitive element (21, 23) shows an area facing the process with a size, which is approximately equivalent to the size of an area of the corresponding pressure means (5, 7) facing the process, preferably is identical thereto.

In another preferred embodiment, the pressure difference sensor (1) as described herein, characterized in that the first measurement line (9) and the first compensation line (17) and/or the second measurement line (11) and the second compensation line (19) are respectively arranged in a common cover (13, 15) embodied as a mechanical protection means.

In another preferred embodiment, the pressure difference sensor (1) as described herein, characterized in that the first measurement line (9) and the first compensation line (17) and/or the second measurement line (11) and the second compensation line (19) show an identical line cross-section and/or an identical length and/or an identical volume and/or an identical thermal conductivity and/or an identical filling.

BRIEF DESCRIPTION OF THE DRAWINGS

FIG. 1 is a line drawing evidencing a pressure difference sensor according to prior art.

FIG. 2 is a line drawing evidencing a sketch of the principle of the pressure difference sensor of FIG. 1.

FIG. 3 is a line drawing evidencing a sketch of the principle of a pressure difference sensor according to the present invention.

FIG. 4 is a line drawing evidencing a further development of the pressure difference sensor of FIG. 3.

DETAILED DESCRIPTION OF THE INVENTION

A pressure difference sensor according to the invention with at least one pressure difference measuring cell, at least a first pressure means, and at least a first measurement line for transferring a first pressure applied upon the first pressure means to a first side of the pressure difference measuring cell is characterized in that the pressure difference sensor comprises at least a first compensation line showing the same features as the first measurement line, which is arranged parallel to said first measurement line and is connected to a second side of the pressure difference measuring cell.

The present invention is based on the acknowledgment that precise and cost-effective compensation of thermally and mechanically induced measurement faults can occur particularly easily by compensating the measurement faults in a mechanical fashion, wherein preferably subsequent expensive electronic compensation devices can be waived or at least be embodied in a much less expensive fashion.

By the first compensation line provided according to the invention, which may show preferably the same features as the measurement line and is preferably arranged parallel to the measurement line, it is achieved that a temperature influencing the measurement line and/or a mechanical impact upon the measurement line affects the compensation line in the same fashion. Due to the fact that the first measurement line and the compensation line show identical features, which include particularly identical thermal and mechanical features, external influences trigger identical effects in both lines so that a measurement fault occurring in the measuring line, particularly a change in pressure, triggers the same in the compensation line. Compensating measurement faults can therefore occur in a simple mechanical fashion by feeding the measurement fault to the second side of the pressure difference measuring cell.

In a further development the pressure difference sensor may show a second pressure means as well as a second measurement line for transferring a second pressure applied upon the second pressure means to the second side of the pressure difference measuring cell as well as a second compensation line showing the same features as the second measurement line, wherein the second compensation line preferably is arranged parallel in reference to the second measurement line and connected to the first side of the pressure difference measuring cell.

By providing a second pressure means as well as a second measurement line and a second compensation line the typical application for pressure difference sensors can be implemented such that both sides of the pressure difference measuring cell are respectively impinged upon via a measurement line and a pressure means with the respective process pressure. This is particularly the case if the pressure difference sensor is arranged in measurement environments with high temperatures, which for example may be damaging for an electronic measuring system of the pressure difference sensor.

The first side of the pressure difference measuring cell is accordingly subjected to a first measurement pressure, provided by the pressure means, the measurement fault developing in the first measurement line, as well as the measurement fault developing in the second compensation line, while the second side of the pressure difference measuring cell is subjected to the second pressure, provided by the second pressure means, the measurement fault developing in the second measurement line, as well as the measurement fault developing in the first compensation line. In a comparison of the pressures applied at the pressure difference measuring cell it is easily discernible that the respectively influencing measurement faults mutually compensate each other and thus only the respective measurement pressures are fed to the pressure difference measurement cell.

A particularly precise reconstruction of the measurement fault developing can be yielded when the first compensation line and/or the second compensation line are connected to a pressure-insensitive element replicating the allocated pressure means, which is subjected to the process conditions in the same fashion as the corresponding pressure means. Due to the fact that in addition to a compensation line a pressure-insensitive element replicating the pressure means is provided, which is subjected to the process conditions in the same fashion as the pressure means, any influence of the process temperature upon the transfer medium can also be very precisely reconstructed in the compensation line so that any measurement faults caused by the process temperature can be compensated.

A particularly clever embodiment of the pressure means and the pressure-insensitive element replicating the pressure means can be achieved in that the pressure-insensitive element and the pressure means are integrated in a process connection to arrange the pressure means in the process environment. By such a joint integration, further a homogenizing effect can be yielded of the impact of the process temperature upon the pressure means and the pressure-insensitive element.

A particularly space-saving arrangement, which also shows a temperature impact upon the pressure means and the pressure-insensitive element as homogeneously as possible, is given when the pressure-sensitive element is embodied surrounding the pressure means in an annular fashion. Such an arrangement is beneficial because the pressure means is generally a circularly embodied membrane for compensating the pressure in the process environment.

In order to yield a temperature impact upon the pressure means and the pressure-sensitive element as homogeneously as possible it is advantageous for the pressure-sensitive element to show an area facing the process with a size that is approximately equivalent to the area of the pressure means facing the process, preferably identical thereto. In a concrete embodiment here the annular area of the pressure-sensitive element surrounding the pressure means is identical to the membrane area of the corresponding pressure means.

Influences of temperature and mechanical influences acting upon the measurement line and compensation line arranged between the pressure means and the pressure measuring cell can be compensated in a particularly good manner when the first measurement line and the first compensation line and/or the second measurement line and the second compensation line are respectively arranged in a common cover embodied as a mechanical protective means. By an appropriate common cover any temperature influences are evenly distributed to the measurement line and the compensation line so that temperature influences affect both lines identically. By such mechanical protection, any mechanical influences, for example excessively tight radii or bends, are also transferred to both lines such that measurement faults induced thereby also affect both lines simultaneously and can be compensated at the pressure difference measuring cell.

The above-described compensation of measurement faults can be yielded in a particularly precise fashion if the first measurement line and the first compensation line and/or the second measurement line and the second compensation line show an identical line cross-section and/or an identical length and/or an identical volume and/or an identical thermal conductivity and/or an identical filling. By the consistency of these features it is achieved that particularly temperature influences, but also mechanical effects can trigger both in the measurement line as well as in the compensation line respectively identical pressure changes, and thus measurement faults, or at least ones as identical as possible.

DETAILED DESCRIPTION OF THE FIGURES

FIGS. 1 and 2 illustrate the prior art.

FIG. 3 shows a first exemplary embodiment of a pressure difference sensor 1 according to the present application. A pressure difference sensor 1 comprises as a central element a pressure difference measuring cell 3, with its first side 10 being connected via a measurement line 9 to a first pressure means 5, which is impacted by a first measurement pressure P1. The first measurement pressure P1 applied to the first pressure means 5 is compensated by a first membrane of the first pressure means 5 and transferred via an incompressible transfer medium, typically oil, located in the first pressure means 5 and the first transfer line 9, to the first side 10 of the pressure difference measuring cell 3.

In order to compensate measurement faults developing in the area of the first measurement line 9 by temperature influences or mechanical influences a second side 12 of the pressure difference measuring cell 3 is connected to a first compensation line 17, which shows the same features as the first measurement line 9 and is arranged parallel in reference thereto. The first measurement line 9 and the first compensation line 17 are further arranged in a common first cover 13, which is further embodied as a mechanical protection for both lines 9, 17. By the common first cover 13 it is additionally ensured that temperature influences of mechanical influences impacting the area of the lines 9, 17 affect the first measurement line 9 and the first compensation line 17 in the same fashion and thus cause identical pressure changes in both lines 9, 17.

As discernible from FIG. 3, the second side 12 of the pressure difference measuring cell 3 is coupled to a second measurement line 11, which is connected to a second pressure means 7. A second compensation line 19 is arranged parallel in reference to the second measurement line 11, similar to the embodiment regarding the first pressure means 5, and is located with it in a common second cover 15. The second compensation line 19 is connected to the first side 10 of the pressure difference measuring cell 3.

The present invention ensures that measurement faults occurring in the area of the lines 9, 17, 11, 19 due to temperature influences or mechanical influences affect the measurement line 9, 11 as well as the allocated compensation lines 17, 19 in the same fashion and are fed to the different sides 10, 12 of the pressure difference measuring cell 3. Due to the fact that the measurement faults are fed to the respectively opposite sides of the pressure difference measuring cell 3 they are compensated in a purely mechanical fashion inside the pressure difference measuring cell 3 such that ultimately it is effectively fed only with the first process pressure P1 and the second process pressure P2.

FIG. 4 shows a further development of the pressure difference sensor 1 of FIG. 3, wherein the first compensation line 17 in the present exemplary embodiment is connected to a first pressure-insensitive element 21, which is embodied annularly surrounding the first pressure means 5 and is integrated with it in a first process connection 25. Similarly, the second compensation line 19 is connected to a second pressure-insensitive element 23, which is embodied annularly surrounding the second pressure means 7 and is integrated therewith in a second process connection 27. By providing a respective pressure-insensitive element 21, 23 it can be ensured that a process temperature impacting the pressure means 5, 7 is not only coupled to the respective measuring branches but similarly also to the compensation branches, and a measurement fault caused thereby is therefore generated in both branches identically. The integration of the pressure means 5, 7 and the pressure-insensitive elements 21, 23 in respectively a process connection 25, 27 further allows a simple arrangement of the pressure means 5, 7 and the pressure-insensitive elements 21, 23 in the process environment. In the present exemplary embodiment the pressure-insensitive elements 21, 23 are respectively embodied such that the size of the area of the pressure-insensitive elements 21, 23 facing the process is equivalent to the size of the area of the membrane of the corresponding pressure means 5, 7. This way the process temperature shows the same effect both upon the pressure-insensitive element 21, 23 as well as the pressure means 5, 7.

It shall be mentioned here that the above-described measures may be provided respectively at only one or also both branches of the pressure difference measuring cell, however a particularly good error compensation is yielded when the measures presented are implemented in both measurement branches.

LIST OF REFERENCE NUMBERS

1 Pressure difference sensor
2 Tank
3 Pressure difference measuring cell
4 Housing
5 First pressure means
7 Second pressure means
9 First measurement line
10 First page
11 Second measurement line
12 Second side
13 First cover
15 Second cover
17 First compensation line
19 Second compensation line
21 First pressure-insensitive element
23 Second pressure-insensitive element
25 First process connection
27 Second process connection
P1 First pressure
P2 Second pressure The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A pressure difference sensor having at least one differential pressure difference measurement cell, a first pressure means, a first measurement line for transmitting a first pressure acting on the first pressure means to a first side of the differential pressure difference measurement cell, a second pressure means, and a second measurement line for transmitting a second pressure acting on the second pressure means to a first side of the differential pressure difference measurement cell, wherein the pressure difference sensor has at least one first compensation line for compensating for thermally and mechanically induced measurement errors, which first compensation line is arranged parallel to the first measurement line and is connected to the second side of the differential pressure difference measurement cell, wherein the first compensation line has the same thermal and mechanical properties as the first measurement line, wherein the first measurement line and the first compensation line are arranged in such a manner that a temperature acting on the first measurement line and/or a mechanical action acting on the first measurement line act(s) equally on the compensation line.

2. The pressure difference sensor according to claim 1, wherein the pressure difference sensor has a second compensation line for compensating for thermally and mechanically induced measurement errors with the same thermal and mechanical properties as the second measurement line, which second compensation line is arranged parallel to the second measurement line, wherein the second measurement line and the second compensation line are arranged in such a manner that a temperature acting on the second measurement line and/or a mechanical action acting on the second measurement line act(s) equally on the compensation line.

3. The pressure difference sensor according to claim 2, further comprising wherein the first compensation line and/or the second compensation line is/are connected to a pressure-insensitive element which simulates the associated pressure means and is exposed to the process conditions in the same manner as the associated pressure means.

4. The pressure difference sensor according to claim 3, wherein the pressure-insensitive element is integrated, together with the associated pressure means, into a process connection.

5. The pressure difference sensor according to claim 3, wherein the pressure-insensitive element is designed to annually surround the associated pressure means.

6. The pressure difference sensor according to claim 3, wherein the pressure-insensitive element has a surface, facing the process, of a size which corresponds to a size of a surface of the associated pressure means facing the process, and is identical thereto.

7. The pressure difference sensor according to claim 1, wherein the first measurement line and the first compensation line and/or the second measurement line and the second compensation line are respectively arranged in a cover designed as mechanical protection.

8. The pressure difference sensor according to claim 1, wherein the first measurement line and the first compensation line and/or the second measurement line and the second compensation line have an identical line cross section and/or an identical length and/or an identical volume and/or an identical thermal conductivity and/or an identical filling.

* * * * *